May 19, 1970     L. F. PHARISS     3,512,229
OUTSIDE PIPE LINEUP CLAMP
Filed Aug. 16, 1968
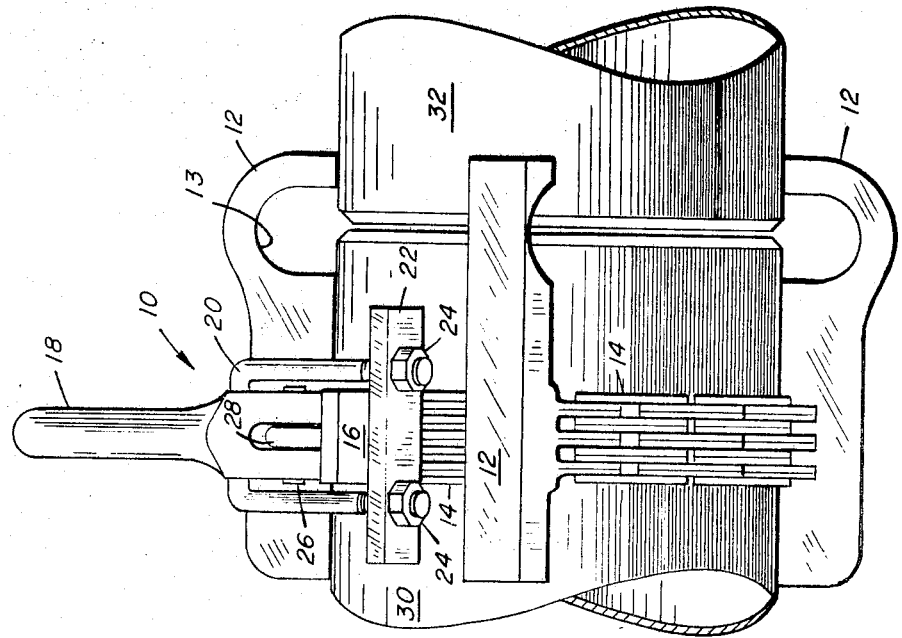
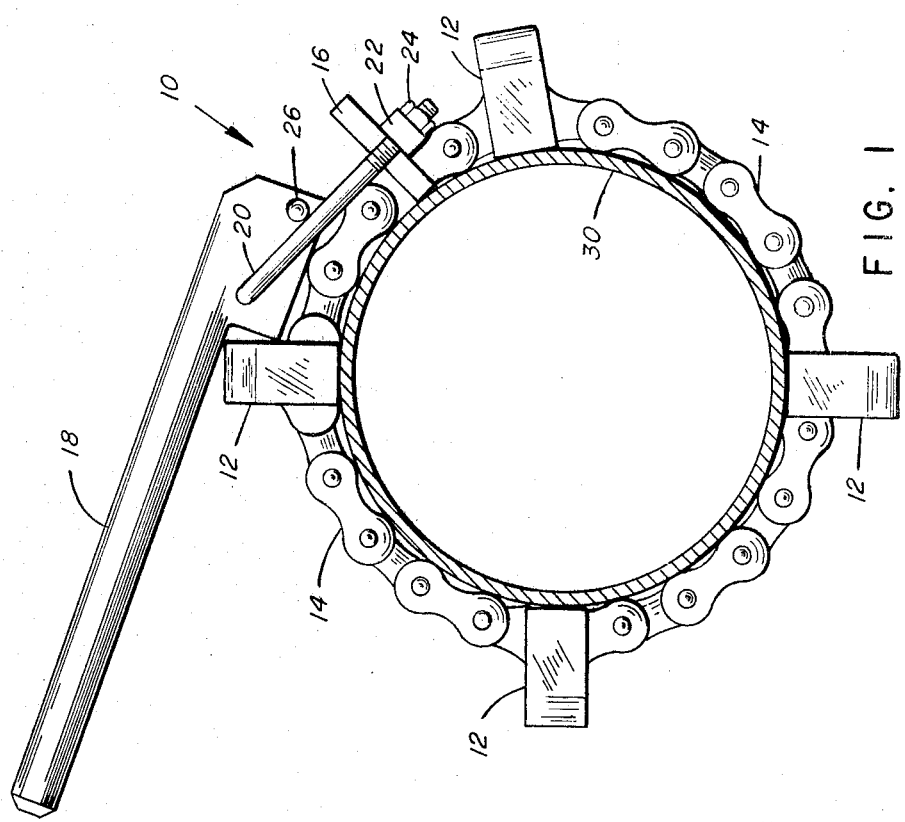
INVENTOR.
LEON F. PHARISS
BY
*Head & Johnson*
ATTORNEYS

United States Patent Office 3,512,229
Patented May 19, 1970

1

3,512,229
OUTSIDE PIPE LINEUP CLAMP
Leon F. Phariss, 2001 N. Mingo Road,
Tulsa, Okla. 74116
Filed Aug. 16, 1968, Ser. No. 753,147
Int. Cl. B65d 63/02
U.S. Cl. 24—280                    1 Claim

ABSTRACT OF THE DISCLOSURE

Pipe or fitting joints to be welded are aligned and retained by a plurality of U-bar members circumferentially spaced on a flexible leaf chain to permit uninterrupted welding of the joint.

CROSS-REFERENCE TO RELATED APPLICATION

This application is an improvement upon prior copending application S.N. 627,784, filed Apr. 3, 1967, now U.S. Pat. No. 3,414,950, issued Dec. 10, 1968.

BACKGROUND OF THE INVENTION

In the laying of pipeline the consecutive pipe sections are held in close coaxial alignment by various means while the pipe sections are welded together. Quite often the adjacent pipe section ends are not capable of being properly aligned because one of the other of the pipe sections is slightly out of round or contains a high spot which does not properly align with the adjacent pipe section. In addition, dealing with small diameter pipe, within the range of two to twelve inches, the problem of making welding connection with adjacent pipe sections or fittings such as elbows, flanges and T fittings, requires exacting lineup to achieve a proper welded connection.

SUMMARY

This invention relates to a lineup clamp having a wrap around chain retainable on one section of pipe with means to align and rigidly hold adjacent sections of pipe or fittings preparatory to and during welding operations and which will permit 360° periphery welding without removing the clamp.

BRIEF DESCRIPTION OF THE DRAWINGS

FIG. 1 is an end view of the clamp of this invention in position around the pipe section.

FIG. 2 is a side elevational view of the clamp of this invention in place relative to adjacent pipe ends.

DESCRIPTION OF THE PREFERRED EMBODIMENT

Referring now to the drawings in detail, the pipe clamp of this invention is generally designated by the numeral 10 and includes equally spaced U-bar members 12 about the periphery therewith. The U-bar members are held in position by a leaf type chain 14 which is adaptable to be wrapped about the outer periphery as for example about one pipe 30. Each of the U-bar members is provided with an inverted U-type opening 13 which is adapted, when the device is in position, to straddle the joint about which welding is to take place. Hence, the welder may be able to position the welding rod beneath and across the U-bar straddle opening 13 and substantially continue the welding operation without change of clamp position or removal. The chain member is clamped by an arrangement comprising a plate member 16 connected at one end of the chain while at the other end a handle member 18 includes a threaded U-bolt portion 20 which has an adjustable bar member 22 positioned by nuts 24. A hinge pin 26 extends through the yoke end of handle 18 and a pivot hinge member 28 which is welded to chain member 14. When in position and adaptable for use, the adjacent sections of pipes 30 and 32 and/or a pipe and a fitting such as an elbow or T are abutted and retained while the leaf chain is wrapped around the pipe in such a manner whereby the opening 13 is adapted to straddle the section or joint to be welded. The U-bolt 20 and its adjustable bar 22 are placed over the plate 16 and by pivoting the handle 18 downward or towards the pipe, the U-bolt is adapted to be pivoted to an offcenter position. The leverage permitted by this arrangement tends to cause the U-bar members to be forced radially inwardly correcting any irregularities in the two sections to be welded and at the same time maintain them properly aligned with the welding operation.

What is claimed:

1. A clamp to align and retain adjacent sections of pipe and/or fittings comprising:
   a flexible chain member adaptable to extend substantially around the outer periphery of one section;
   means to interconnect and lockably retain adjacent ends of said chain; and
   a plurality of circumferentially spaced U-bar members extending longitudinally parallel to the axis of said pipe so as to overlap the joint to be welded and including a recessed opening in each of said U-bar members over said joint to permit the welding operation to go thereunder.

References Cited

UNITED STATES PATENTS

| | | | |
|---|---|---|---|
| 1,432,926 | 10/1922 | Thronsen | 269—43 |
| 2,108,077 | 2/1938 | Robinson | 269—43 |
| 2,432,374 | 9/1949 | Ruschmeyer | 24—280 XR |
| 2,783,359 | 2/1957 | Gunther | 219—161 XR |

DONALD A. GRIFFIN, Primary Examiner

U.S. Cl. X.R.
219—161